(12) United States Patent
Nagata et al.

(10) Patent No.: US 11,645,855 B2
(45) Date of Patent: May 9, 2023

(54) CAMERA SYSTEM TO MONITOR THE PASSENGERS IN A VEHICLE AND DETECT PASSENGER ACTIVITIES

(71) Applicant: Toyota Motor Engineering & Manufacturing North America, Inc., Plano, TX (US)

(72) Inventors: Katsumi Nagata, Foster City, CA (US); Masashi Nakagawa, Sunnyvale, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/135,429

(22) Filed: Dec. 28, 2020

(65) Prior Publication Data

US 2022/0207278 A1 Jun. 30, 2022

(51) Int. Cl.
| | | |
|---|---|---|
| *G06V 20/59* | (2022.01) | |
| *G06F 3/14* | (2006.01) | |
| *H04N 7/18* | (2006.01) | |
| *H04N 5/76* | (2006.01) | |
| *B60R 1/00* | (2022.01) | |
| *B60K 35/00* | (2006.01) | |
| *G01C 21/36* | (2006.01) | |
| *G06V 20/56* | (2022.01) | |

(Continued)

(52) U.S. Cl.
CPC ............ *G06V 20/59* (2022.01); *B60K 35/00* (2013.01); *B60R 1/00* (2013.01); *G01C 21/3602* (2013.01); *G06F 3/14* (2013.01); *G06V 20/56* (2022.01); *G06V 40/176* (2022.01); *G06V 40/20* (2022.01); *H04N 5/76* (2013.01); *H04N 7/181* (2013.01); *H04N 23/90* (2023.01); *B60K 2370/164* (2019.05); *B60K 2370/166* (2019.05); *B60K 2370/21* (2019.05); *B60R 2300/105* (2013.01); *B60R 2300/205* (2013.01)

(58) Field of Classification Search
CPC .......... G06K 9/00832; G06K 9/00315; G06K 9/00335; G06K 9/00791; B60K 35/00; B60R 1/00; G06F 3/14; H04N 5/247; H04N 5/76; H04N 7/181; G01C 21/3602
USPC ....................................................... 348/148
See application file for complete search history.

(56) References Cited

U.S. PATENT DOCUMENTS

2016/0057138 A1\* 2/2016 Hoyos .................. G06V 40/168
 726/7
2017/0111587 A1\* 4/2017 Herbst ............... G01C 21/3626

(Continued)

*Primary Examiner* — Rebecca A Volentine
*Assistant Examiner* — Matthew David Kim
(74) *Attorney, Agent, or Firm* — Snell & Wilmer LLP (57) ABSTRACT

Methods, systems, and apparatus for a monitoring system are disclosed. The monitoring system includes a memory configured to store image data and a first camera configured to capture first image data including the activity of a passenger within the vehicle. The electronic control unit is configured to obtain, from the first camera, the first image data including the passenger, determine an activity of the passenger based on the first image data, and determine that the activity of the passenger will be different than a baseline activity of the passenger. The electronic control unit is configured to record and capture, in the memory and using the camera, the first image data for a time period before and after the determination that the activity of the passenger will be different than the baseline activity.

20 Claims, 7 Drawing Sheets

(51) Int. Cl.
*G06V 40/20* (2022.01)
*G06V 40/16* (2022.01)
*H04N 23/90* (2023.01)

(56) References Cited

U.S. PATENT DOCUMENTS

2019/0022347 A1\* 1/2019 Wan .......................... A61B 5/18
2019/0162549 A1\* 5/2019 Fouad .............. G08G 1/096708
2020/0401820 A1\* 12/2020 Nagata ................. G06V 20/597
2021/0183261 A1\* 6/2021 Kawasaki Fortner . G09B 19/06

\* cited by examiner

CAMERA SYSTEM TO MONITOR THE PASSENGERS IN A VEHICLE AND DETECT PASSENGER ACTIVITIES

BACKGROUND

Field

This disclosure relates to monitoring the activities of passengers in a vehicle, and detecting, predicting and documenting any change of activities.

Description of the Related Art

While travelling in a vehicle, a driver typically cannot see the rear compartments of the vehicle. In certain situations, the passengers of a vehicle may be completely out of view of the driver, even through the rear-view mirror. For example, a baby or small child under the age of 2 years, may be riding in a rear-facing car seat in a rear row of the vehicle. In order to monitor the child, the driver can set up a mirror in front of the car seat, and see the child using the vehicle's rear-view mirror. However, this arrangement is limited by the positioning and size of the mirror, and only a small portion of the vehicle's cabin can be viewed. In some instances, the driver may also want to monitor other young passengers in the vehicle, pets or other animals in the vehicle, and/or fragile items in the vehicle that may not be visible to the driver using a mirror system. Further, the driver may want to anticipate a certain activity of a passenger before it occurs, or observe events occurring outside of the vehicle that have triggered some action by a passenger. Similarly, with the development of fully autonomous vehicles, an individual may wish to monitor the passengers of a vehicle when they are not present in the vehicle. Additionally, a driver who is hearing impaired may not be alerted if a baby or animal passenger is in distress, or if a fragile item has become unsecured or has fallen over.

Accordingly, there is a need for a system and method for safely anticipating, predicting and/or reporting the activities of passengers within and surrounding the vehicle.

SUMMARY

In general, one aspect of the subject matter described in this disclosure may be embodied in a monitoring system for a vehicle. The monitoring system includes a first camera configured to capture first image data including one or more passengers in the vehicle. The monitoring system includes a memory configured to store image data. The monitoring system includes an electronic control unit coupled to the first camera and the memory. The electronic control unit is configured to obtain, from the first camera, the first image data including the one or more passengers. The electronic control unit is configured to determine an activity of each of the one or more passengers based on the first image data. The activity is one or more of a motion and a facial expression. The electronic control unit is configured to determine that the activity of each of the one or more passengers will be different than a baseline activity for each of the one or more passengers. The electronic control unit is configured to record and capture, in the memory and using the first camera, the first image data for a time period before and after the determination that the activity of each of the one or more passengers will be different than the baseline activity.

These and other embodiments may optionally include one or more of the following features. The first camera may include one or more internal cameras. The one or more internal cameras may be configured to capture different views of the interior of the vehicle.

The electronic control unit may include an output device. The output device may be configured to notify a user of the output device that an activity is occurring in response to the determination that the activity of at least one of the one or more passengers is different than the baseline activity. The output device may include one or more displays. The electronic control unit may be configured to notify the user of the output device that an activity is occurring by displaying an icon corresponding to the activity on the output device. The electronic control unit may be configured to notify the user of the output device that an activity is occurring by displaying a live video from the one or more internal cameras on the output device. The one or more displays may include a vehicle display, the vehicle display including one or more of a head up display, a multi-information display, and an in-vehicle infotainment display located in a front compartment of the vehicle. The one or more displays may include a mobile display located on a mobile device. The mobile display may be located remotely from the vehicle.

The monitoring system may further include a user interface configured to receive commands from the user to display a live video image from the one or more internal cameras on the one or more displays.

The monitoring system may further include a second camera. The second camera may include one or more external cameras configured to capture views of the surrounding environment outside the vehicle. The user interface may be configured to receive commands from the user to display a live video image from the one or more external cameras on the one or more displays.

The monitoring system may further include a navigation unit. The navigation unit may be configured to obtain navigation map information including allocation of an entity and a current location of the vehicle. The electronic control unit may be configured to notify the user of a route to the entity when the monitoring system determines that an activity of at least one of the one or more passengers is occurring.

In another aspect, the subject matter may be embodied in a monitoring system for a vehicle. The monitoring system includes a first camera. The first camera is configured to capture first image data including a passenger in the vehicle. The monitoring system includes a memory configured to store image data. The monitoring system includes an electronic control unit coupled to the first camera and the memory. The electronic control unit is configured to obtain, from the first camera, the first image data including the passenger. The electronic control unit is configured to determine a baseline activity of the passenger. The electronic control unit is configured to determine an activity of the passenger based on the first image data. The electronic control unit is configured to determine that the activity of the passenger will be different than the baseline activity for the passenger. The electronic control unit is configured to record and capture, in the memory and using the first camera, the first image data for a time period before and after the determination that the activity of the passenger will be different than the baseline activity.

The electronic control unit may be configured to observe the activity of the passenger. The electronic control unit may be configured to determine a pattern of motions and facial expressions associated with the activity of the passenger.

The electronic control unit may be configured to establish that the activity of the passenger that occurs with the most frequency is the baseline activity of the passenger. The monitoring system may include a user interface configured to receive data input from a user. The electronic control unit may be configured to receive data input from the user that assigns a pattern of motions and facial expressions of the passenger with a baseline activity of the passenger.

In another aspect, the subject matter may be embodied in a method for notifying a user of an output device of an activity of a passenger within a vehicle. The method includes obtaining, by a processor and from a first camera, first image data of a compartment of the vehicle including the passenger. The method includes determining, by the processor, an activity of the passenger within the compartment of the vehicle. The method includes determining, by the processor, that the activity of the passenger will be different than a baseline activity of the passenger. The method includes recording and storing in a memory, by the processor and using the first camera, the first image data. The method includes sending the first image data, by the processor, to the output device, thereby notifying the user of the activity of the passenger. The step of recording the first image data may include recording the first image data for a time period before and after the step of determining that the activity of the passenger will be different than the baseline activity. The method may further include obtaining, from a second camera and by the processor, second image data of a surrounding environment outside the vehicle. The method may further include recording and storing in a memory, by the processor and using the second camera, the second image data. The method may further include sending the second image data, by the processor, to the output device after determining that the activity of the passenger will be different than a baseline activity of the passenger. The step of recording the second image data may include recording the second image data for a time period before and after determining that the activity of the passenger will be different than a baseline activity.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles and methods for monitoring the passengers inside a vehicle and detecting certain activities of passengers inside the vehicle. Particular embodiments of the subject matter described in this disclosure may be implemented to realize one or more of the following advantages. The monitoring system includes internal cameras within the vehicle to capture live video images and transmit the images to the electronic control unit (e.g. an in-vehicle infotainment (IVI) system, etc.). The electronic control unit will run a trained edge computing artificial intelligence (AI) algorithm on the live video feed to identify the type of passenger, e.g. a baby, a young child, a pet, or a fragile item, and send data, such as a live video image and/or a notification icon to a multi-information display (MID), a head up display (HUD), an IVI display, and/or other user device when certain passenger activities are detected.

The monitoring system uses AI, including machine algorithm learning, with models to anticipate, predict or otherwise determine when a particular activity ("activity") of a passenger occurs or is about to occur in a timely manner. By anticipating, predicting or otherwise determining when the activity occurs or is about to occur, the monitoring system proactively anticipates the activity and may act to report or otherwise record or document the activity. For example, the monitoring system may alert the user if a passenger is in distress, e.g. a crying or choking baby, if a pet or other animal is in an excited state, or if an item has shifted into a position that can damage the item or the interior of the vehicle. The monitoring system may learn from each instance of an activity or circumstance.

The monitoring system captures and records image data before, after and during the occurrence of the activity to fully document the circumstances around the activity. Additionally, the monitoring system may be manually activated by the user to view a live real-time video of the interior of the vehicle at any time, such as at a red light, or while the vehicle is temporarily parked.

Figure 1:
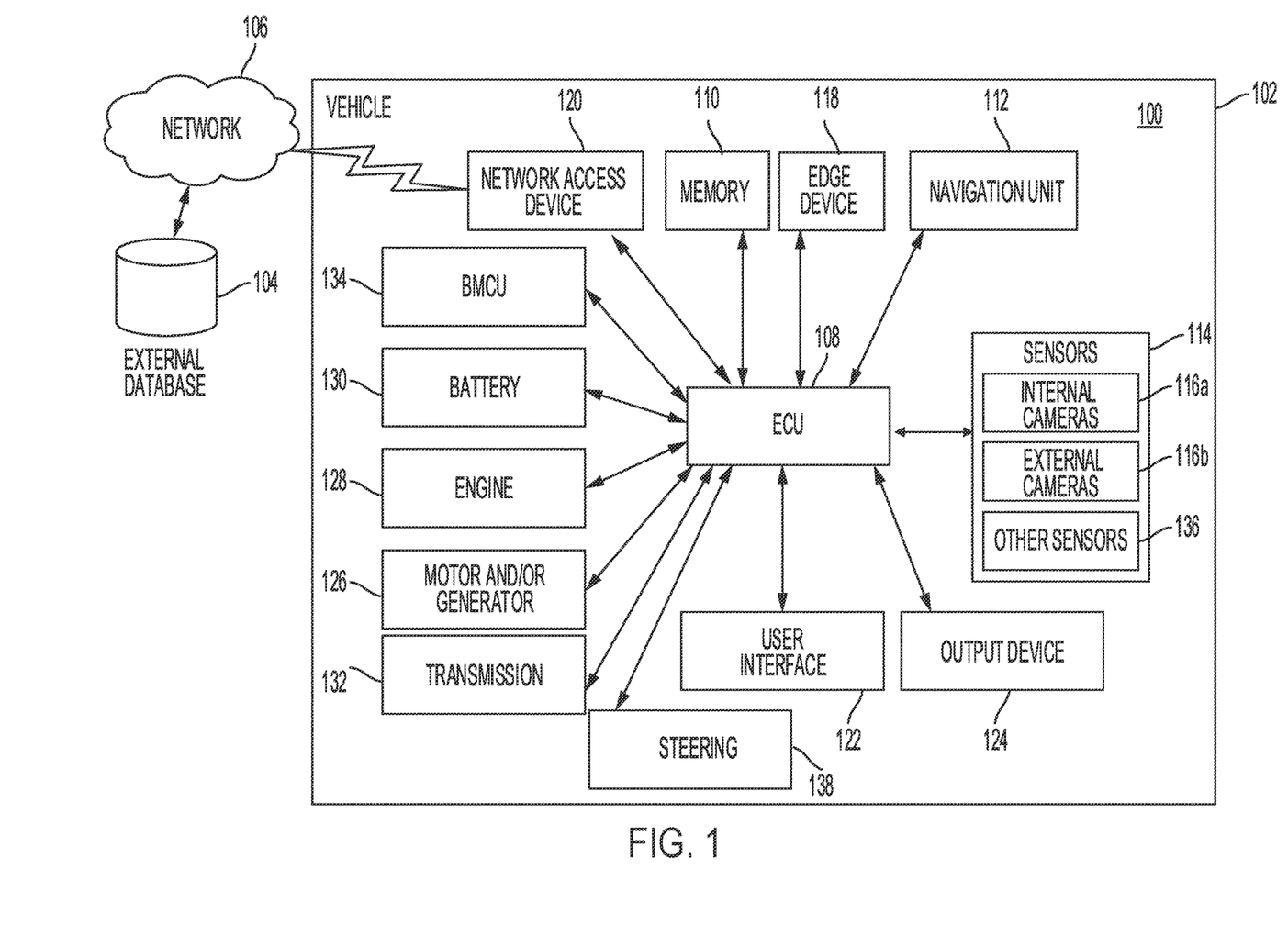
FIG. 1 is a block diagram of an example monitoring system according to an aspect of the invention.

FIG. 1 is a block diagram of a monitoring system 100. The monitoring system 100 may be retro-fitted, coupled to, include or be included within a vehicle 102. The monitoring system 100 may also couple, connect to, or include an external database 104. The monitoring system 100 may connect to a network 106 that links the external database 104 with the vehicle 102. The network 106 may be a local area network (LAN), a wide area network (WAN), a cellular network, the Internet, or combination thereof, that connects, couples and/or otherwise communicates between the vehicle 102 and the external database 104.

The monitoring system 100 monitors the passengers of the vehicle and detects, identifies, predicts and/or anticipates activities that occur and/or may potentially occur in the near future within the vehicle 102. The monitoring system 100 may activate just prior to the activity and record and capture image data before, during and after the occurrence of the activity. The monitoring system 100 may use artificial intelligence including a machine learning algorithm to predict when an activity is about to or has occurred. The monitoring system may couple, connect to, or include an internal edge computing device 118 for rapid and efficient processing at the location of the vehicle 102. The internal edge computing device may include one or more of a central processing unit (CPU), a graphics processing unit (GPU), a tensor processing unit (TPU), a neural processing unit (NPU), etc. The edge computing device 118 may include a relational database or behavioral model database that provides models of normal motions and/or features of different objects or individuals. The edge computing device 118 may be updated and/or provide updates in real-time. The edge computing device 118 may store and/or provide the models to the ECU 108.

The monitoring system 100 may include or be retro-fitted or otherwise coupled with the vehicle 102. A vehicle 102 is a conveyance capable of transporting a person, an object, or a permanently or temporarily affixed apparatus. The vehicle 102 may be a self-propelled wheeled conveyance, such as a car, sports utility vehicle, truck, bus, van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The monitoring system 100 includes one or more processors, such as an electronic control unit (ECU) 108 and a memory 110. The monitoring system 100 may include other components, such as a navigation unit 112, one or more sensors 114 including one or more internal cameras 116*a*, one or more external cameras 116*b*, a network access device 120, a user interface 122 and an output device 124. The monitoring system 100 may also include other sensors 136, such as a vehicle speed sensor and a proximity sensor. The monitoring system 100 may also couple, connect to, and/or include one or more vehicle components such as the motor and/or generator 126, the engine 128, the battery 130, the transmission 132 and/or the battery management control unit (BMCU) 134.

The ECU 108 may be implemented as a single ECU or as multiple ECUs. The ECU 108 may be electrically coupled to some or all of the other components within the vehicle 102, such as the motor and/or generator 126, the transmission 132, the engine 128, the battery 130, the battery management control unit (BMCU) 134, the memory 110, the network access device 120 and/or one or more sensors 114. The ECU 108 may include one or more processors or controllers specifically designed for predicting activities within the vehicle 102. The ECU 108 may generate predictive models and use machine learning algorithms to anticipate activities before the activities occur.

The ECU 108 may analyze the internal environment of the vehicle 102 and compare the data to a baseline and/or input the data into a model to anticipate, predict or otherwise determine any activities within the environment. If an activity is predicted or otherwise detected, the ECU 108 may act to record, document, provide or otherwise act to mitigate consequences of the activity. The ECU 108 may be coupled to the memory 110 and execute instructions that are stored in the memory 110.

The memory 110 may be coupled to the ECU 108 and store instructions that the ECU 108 executes. The memory 110 may include one or more of a Random Access Memory (RAM) or other volatile or non-volatile memory. The memory 110 may be a non-transitory memory or a data storage device, such as a hard disk drive, a solid-state disk drive, a hybrid disk drive, or other appropriate data storage, and may further store machine-readable instructions, which may be loaded and executed by the ECU 108. Moreover, the memory 110 may be used to record and store image data before, after and/or during the occurrence of the activity to document the activity.

Figure 7:
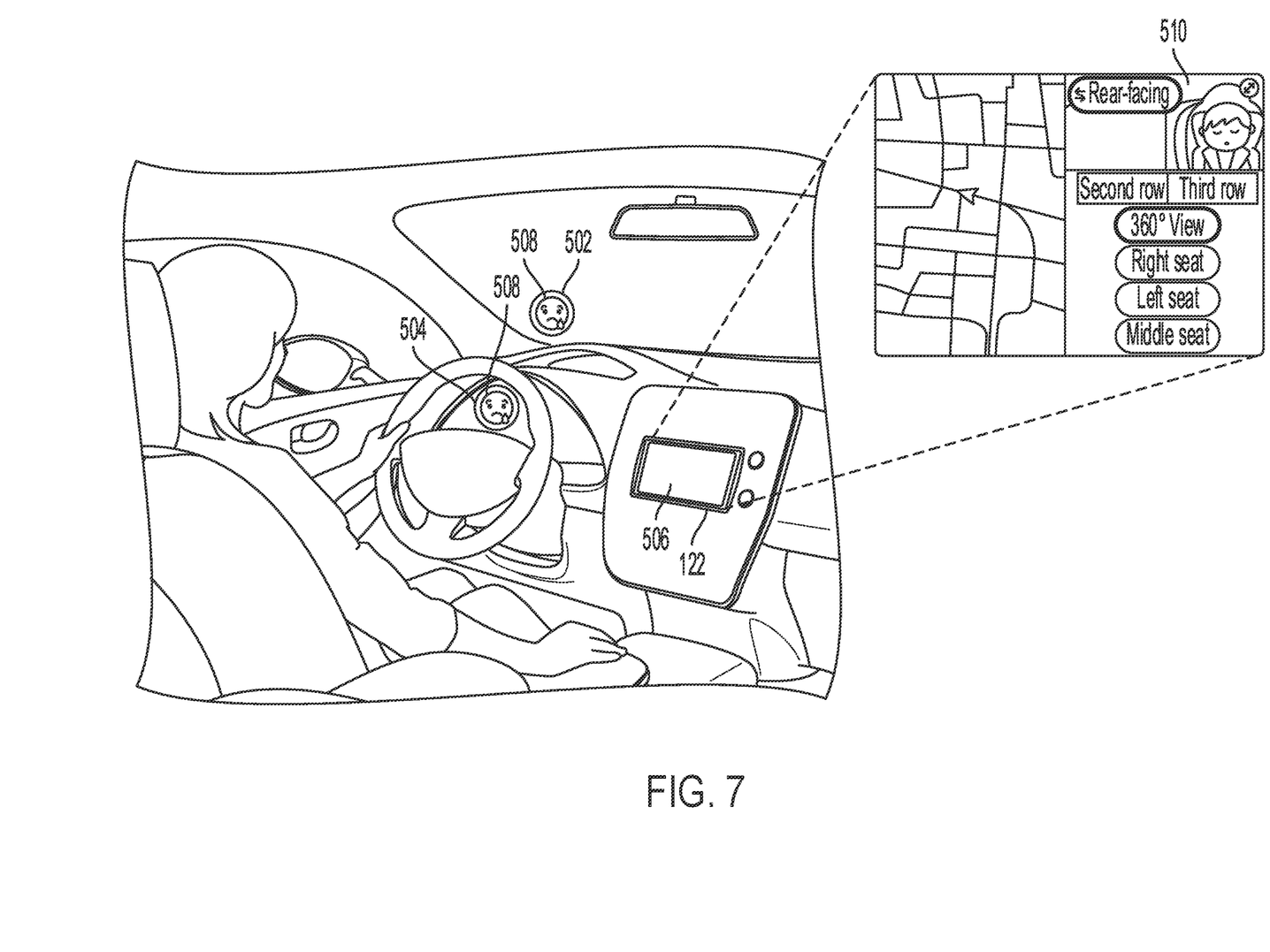
FIG. 7 shows an example illustration of an output device of the monitoring system of FIG. 1 within the vehicle according to an aspect of the invention.

The monitoring system 100 may include a user interface 122. The monitoring system 100 may display one or more notifications on the user interface 122. The one or more notifications on the user interface 122 may notify occupants of the vehicle when the monitoring system 100 is initialized or activated. The user interface 122 may include an input/output device that receives user input from a user interface element, a button, a dial, a microphone, a keyboard, or a touch screen. For example, the user interface 122 may receive user input that may include configurations as to the amount of image data or the length of the video to record when an activity is detected. The user interface 122 may also receive user input that may include configurations as to when to activate cameras 116*a-b*, when to playback recordings, and when to transmit live video to an output device 124. An example of the output device 124 located in the front compartment of the vehicle is illustrated in FIG. 7. The output device 124 may be, for example, a display, such as a head up display (HUD) 502 in the windshield, a multi-information display (MID) 504 in the dashboard, and/or an IVI display 506. For example, each of the HUD 502, the MID 504, and the IVI display 506 may display a notification icon 508 indicating a particular activity of a passenger, e.g. a child crying, and/or a live video 510 of a passenger compartment. Additionally, or alternatively, the output device 124 may be a display on a mobile device. A mobile device may also include a user interface 122. In other examples, the output device 124 may be a speaker, an audio and/or visual indicator, or a refreshable braille display.

The monitoring system 100 may include a network access device 120. The network access device 120 may include a communication port or channel, such as one or more of a Wi-Fi unit, a Bluetooth® unit, a radio frequency identification (RFID) tag or reader, or a cellular network unit for accessing a cellular network (such as 3G, 4G or 5G). The network access device 120 may transmit data to and receive data from the external database 104. For example, the ECU 108 may communicate with the external database 104 to obtain information about entities near the location of the vehicle 102, via the network 106.

The monitoring system may include a navigation unit 112 and/or one or more sensors 114. The navigation unit 112 may be integral to the vehicle 102 or a separate unit coupled to the vehicle 102, such as a personal device with navigation capabilities. When the navigation unit 112 is separate from the vehicle 102, the navigation unit 112 may communicate with the vehicle 102 via the network access device 120. The vehicle 102 may include a Global Positioning System (GPS) unit (not shown) for detecting location data including a current location of the vehicle 102 and date/time information instead of the navigation unit 112. In that regard, the ECU 108 may perform the functions of the navigation unit 112 based on data received from the GPS unit. At least one of the navigation unit 112 or the ECU 108 may predict or propose a route set that includes a starting location and a destination location. The navigation unit 112 or the ECU 108 may perform navigation functions. Navigation functions may include, for example, route and route set prediction, providing navigation instructions, and receiving user input such as verification of predicted routes and route sets or destinations.

The navigation unit 112 may provide and obtain navigational map information including location data, which may include a current location, a starting location, a destination location and/or a route between the starting location or current location and the destination location of the vehicle 102. The navigation unit 112 may include a memory (not shown) for storing the route data. The navigation unit 112 may receive data from other sensors capable of detecting data corresponding to location information. For example, the other sensors may include a gyroscope or an accelerometer.

The navigational map information may include entity information. The entity information may include locations of places of interest, such as a hospital or a veterinarian office. The locations of these different entities may be useful if certain activities of the passengers occur, such as if a baby or animal becomes injured or ill.

Figure 5:
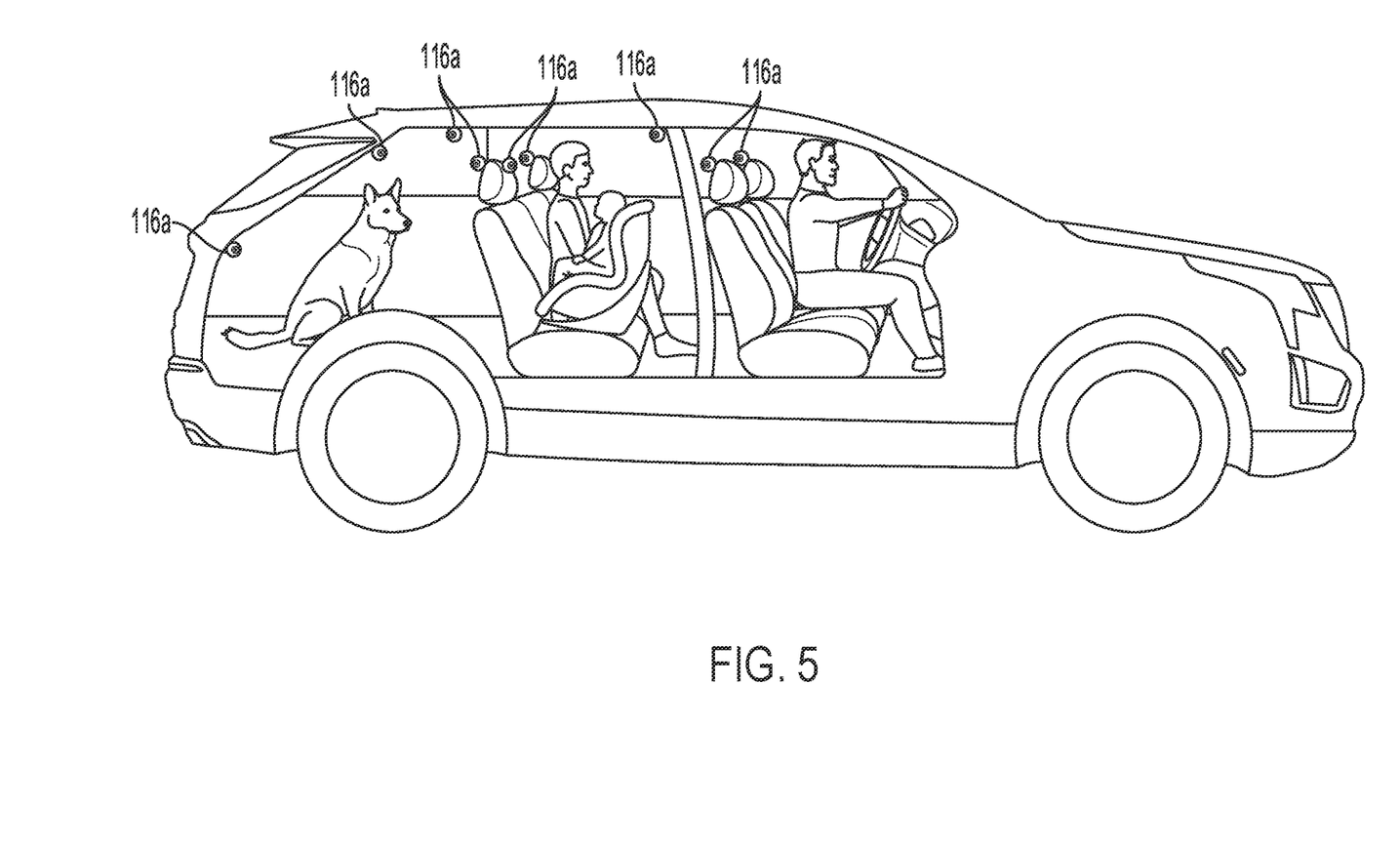
FIG. 5 shows an example illustration of the positioning of one or more internal cameras of the monitoring system of FIG. 1 within the vehicle according to an aspect of the invention.

The one or more sensors 114 may include one or more internal cameras 116a, one or more external cameras 116b, and/or other sensors 136. The one or more internal cameras 116a may include multiple cameras positioned within the vehicle 102 to capture different views within the cabin of the vehicle 102, as shown in FIG. 5 for example. The one or more internal cameras 116a may be positioned within the vehicle 102, such as on the back of the front row seats to capture a view of the rear seats, or on the back of the rear seats to capture a view of the cargo area behind the seats of the vehicle. The one more internal cameras 116a may be positioned on the front of the second row seats to capture a view of a passenger in a car seat, for example. The one or more internal cameras 116a may be positioned near the rear window and directed outward of a pickup truck or placed on a bed rail in the truck bed, for example, to capture a view of the truck bed. The one or more internal cameras may be positioned in the ceiling. The one or more internal cameras 116a may capture image data that includes a single frame or image or a continuous video of the environment inside or within the vehicle 102. The different views within the vehicle may be used to form a panoramic or 360 degree image of the entire cabin, which allows the monitoring system 100 to capture activities within the vehicle 102, such as a crying baby, a barking dog, or an item that has shifted into an undesirable position. The one or more internal cameras 116a may be portable cameras that could be easily attached or installed within the vehicle 102 by a user and powered through power sources in the vehicle 102, such as through USB connectors.

Figure 6:
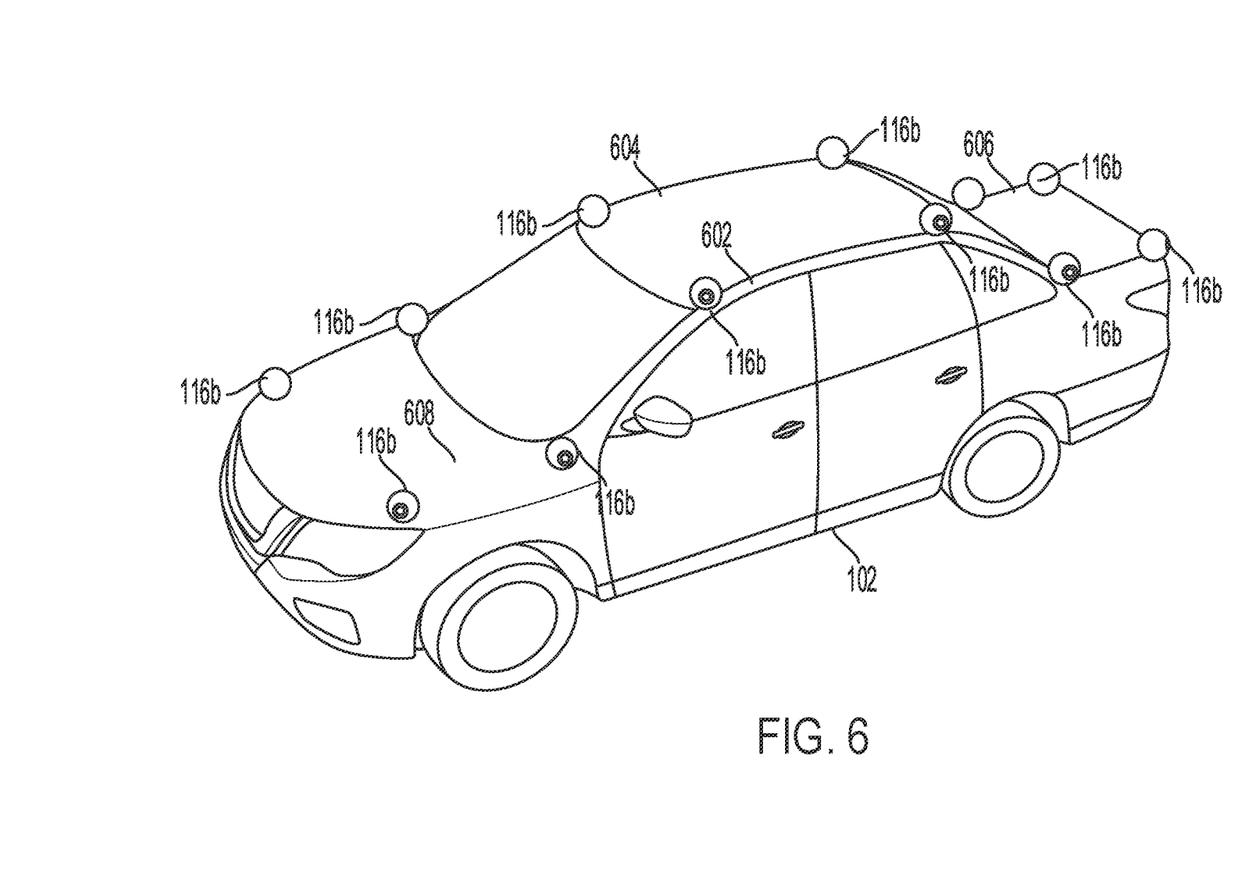
FIG. 6 shows an example illustration of the positioning of one or more external cameras of the monitoring system of FIG. 1 on the vehicle according to an aspect of the invention.

The one or more external cameras 116b may include multiple cameras positioned on the outside of the vehicle 102 to capture different views of the surrounding environment outside the vehicle 102, as shown in FIG. 6 for example. The one or more external cameras 116b may be positioned along a frame 602 of the vehicle 102, such as along the roof 604, the trunk 606 or the front 608 of the vehicle 102. The different views of the surrounding environment may be used to form a panoramic or 360 degree image of the surrounding environment outside the vehicle 102. The one or more external cameras 116b may capture image data that includes a single frame or image or a continuous video of the surrounding environment outside the vehicle 102, which allows the monitoring system 100 to capture activities outside of the vehicle 102 which may impact the activities of the passengers within the vehicle 102, such as an individual approaching or attempting to open the vehicle.

The monitoring system 100 may couple, connect to, and/or include one or more vehicle components. The one or more vehicle components may include a motor and/or generator 126. The motor and/or generator 126 may convert electrical energy into mechanical power, such as torque, and may convert mechanical power into electrical energy. The motor and/or generator 126 may be coupled to the battery 130. The motor and/or generator 126 may convert the energy from the battery 130 into mechanical power, and may provide energy back to the battery 130, for example, via regenerative braking. The vehicle 102 may include one or more additional power generation devices such as the engine 128 or a fuel cell stack (not shown). The engine 128 combusts fuel to provide power instead of and/or in addition to the power supplied by the motor and/or generator 126.

The battery 130 may be coupled to the motor and/or generator 126 and may provide electrical energy to and receive electrical energy from the motor and/or generator 126. The battery 130 may include one or more rechargeable batteries.

The BMCU 134 may be coupled to the battery 130 and may control and manage the charging and discharging of the battery 130. The BMCU 134, for example, may measure, using battery sensors, parameters used to determine the state of charge (SOC) of the battery 130. The BMCU 134 may control the battery 130.

The one or more vehicle components may include the transmission 132. The transmission 132 may have different gears and/or modes, such as park, drive and/or neutral and may shift between the different gears. The transmission 132 manages the amount of power that is provided to the wheels of the vehicle 102 given an amount of speed. The one or more vehicle components may include a steering device 138. The steering device 138 controls the direction of the movement of the vehicle to follow a desired course.

The monitoring system 100 may include or be coupled to the external database 104. A database is any collection of pieces of information that is organized for search and retrieval, such as by a computer, and the database may be organized in tables, schemas, queries, reports, or any other data structures. A database may use any number of database management systems. The external database 104 may include a third-party server or website that stores or provides information. The information may include real-time information, periodically updated information, or user-inputted information. A server may be a computer in a network that is used to provide services, such as accessing files or sharing peripherals, to other computers in the network.

The external database 104 may be a relational database or behavioral model database that provides models of normal motions and/or features of different objects or individuals. The external database 104 may be updated and/or provide updates in real-time. The external database 104 may store and/or provide the models to the ECU 108.

Figure 2:
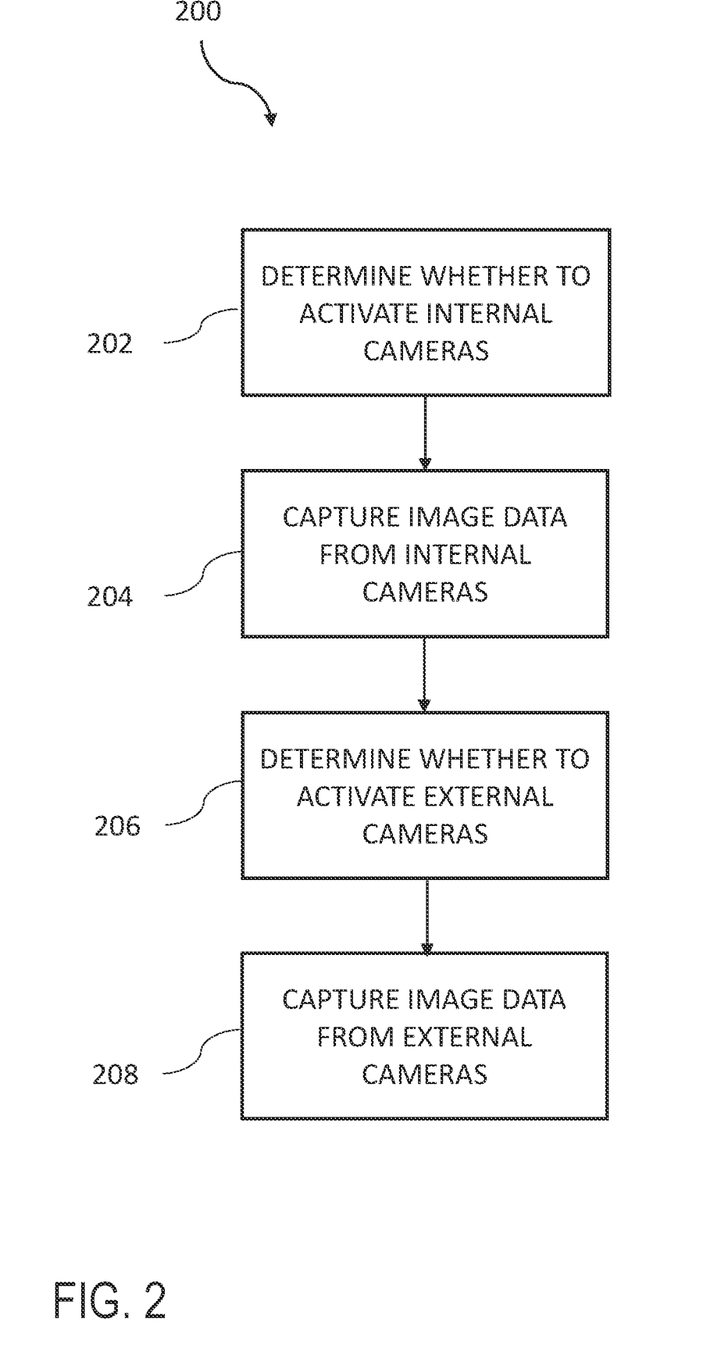
FIG. 2 is a flow diagram of an example process for capturing image data to predict and/or detect an activity using the monitoring system of FIG. 1 according to an aspect of the invention.

FIG. 2 is a flow diagram of an example process 200 for capturing the internal image data to use to predict and/or detect an activity. One or more computers or one or more data processing apparatuses, for example, the ECU 108 of the monitoring system 100 of FIG. 1, appropriately programmed, may implement the process 200.

The monitoring system 100 determines whether to activate the internal cameras 116a and/or external cameras 116b (208). The monitoring system 100 may determine whether to activate the internal cameras 116a and/or external cameras 116b based on the activity of one or more passengers within the vehicle 102.

In some implementations, the monitoring system 100 connects with the external database 104 via the network 106. The external database 104 may be a traffic information database, for example. The monitoring system 100 may provide the current location of the vehicle 102 to the traffic information database, and in response, receive situational factors including the state of one or more traffic lights or signals within the vicinity of the current location of the vehicle 102.

Once the monitoring system 100 is activated, the monitoring system 100 determines whether to activate the internal cameras 116a (202). The monitoring system 100 may automatically be activated once the vehicle is started. Alternatively, the monitoring system 100 may be manually activated by the driver, a front passenger, or by a remote user of an autonomous vehicle. The monitoring system 100 may determine whether to activate the internal cameras 116a based on the presence of rear passengers in the vehicle 102. Once the monitoring system 100 activates the one or more internal cameras 116a, the monitoring system 100 captures image data using the one or more internal cameras 116a (204).

In particular, the one or more internal cameras 116a may capture image data of the environment within the vehicle 102. The one or more internal cameras 116a may be positioned within an interior of the vehicle 102 and directed toward the interior cabin of the vehicle 102 to monitor or capture image data of occupants within the vehicle 102. Each of the one or more internal cameras 116a may be directed to different portions of the interior cabin of the vehicle 102, such as toward the back of the front cabin, toward the front of one or more rows of seats in the rear cabin, cargo area behind the seats, or outward toward the bed of a truck. The one or more cameras 116a may also be positioned within a trunk of the vehicle 102 to capture image data within the trunk. The image data captured by the one or more internal cameras 116a may be a single frame image and/or a multi-frame video. The single frame image and/or the multi-frame video may be stored or buffered in the memory 110. Different perspectives and/or views may be captured and later stitched, merged or otherwise combined to form a panoramic image and/or video.

Once the internal cameras 116a are activated the monitoring system 100 determines whether to activate the external cameras 116b (206). The external cameras may be activated based on a particular activity of one or more of the passengers, e.g. a crying baby or an excited animal. Once the monitoring system 100 activates the one or more external cameras 116b, the monitoring system 100 captures image data using the one or more external cameras 116b (208). The image data may be a single frame image and/or a multi-frame video. The single frame image and/or the multi-frame video may be stored or buffered in the memory 110.

In particular, the one or more external cameras 116b may capture image data of the surrounding environment outside the vehicle 102. The one or more external cameras 116b may be positioned on an exterior of the vehicle 102. Each of the one or more external cameras 116b may capture a different image of a different perspective of the surrounding environment outside the vehicle 102 such that together all of the one or more external cameras 116b may capture a 360 degree perspective view of the surrounding environment. The different images may be later stitched, merged or otherwise combined to form a panoramic image and/or video.

The image data among all the cameras 116a-b may be combined or otherwise coalesced into an image or video that captures the entire environment inside and outside the vehicle 102 for a time period and the image data includes different passengers inside and the environment outside the vehicle 102.

Figure 3:
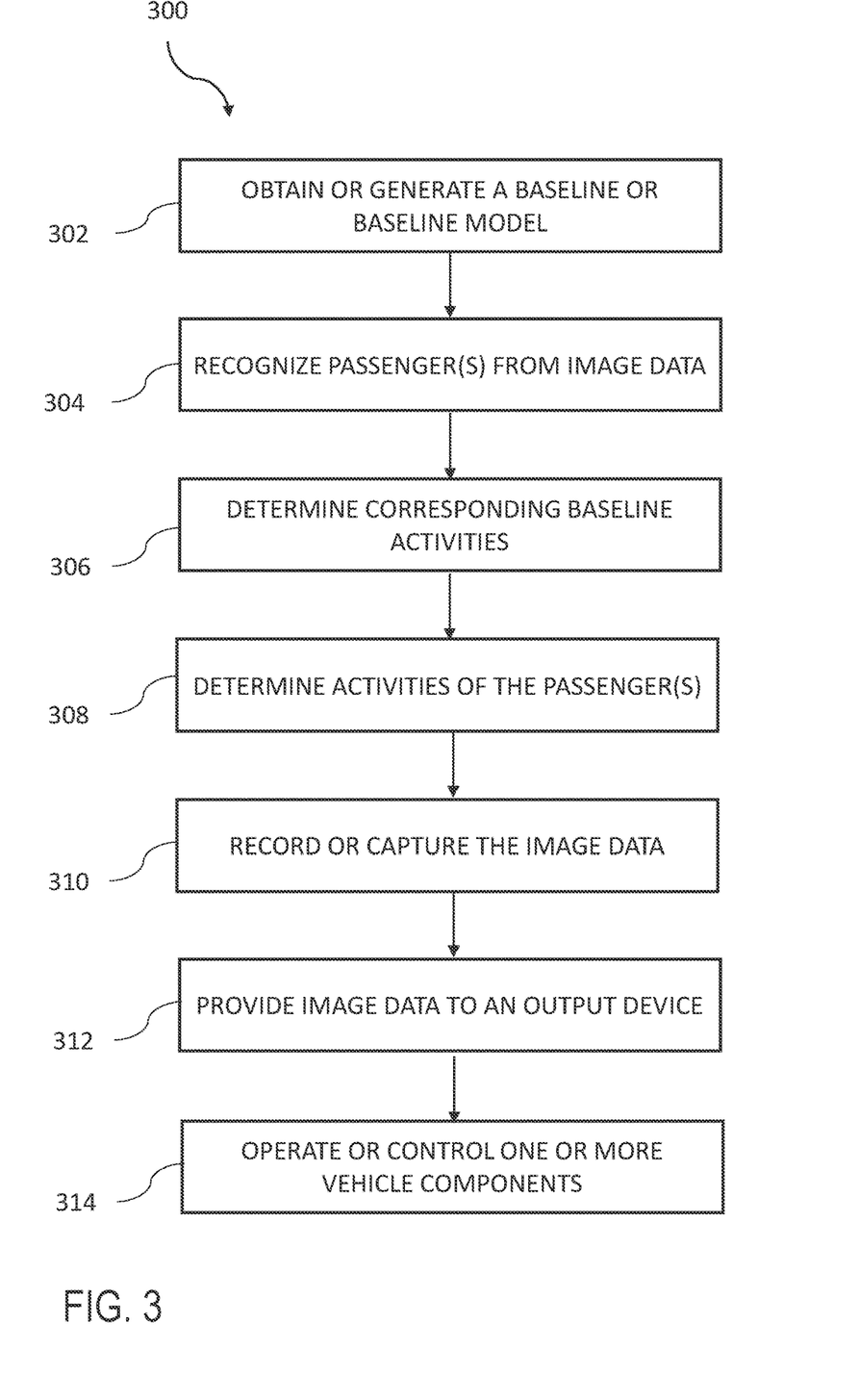
FIG. 3 is a flow diagram of an example process for detecting or predicting an activity and taking action using the monitoring system of FIG. 1 according to an aspect of the invention.

FIG. 3 is a flow diagram of an example process 300 for detecting or predicting a passenger activity when the monitoring system is activated. One or more computers or one or more data processing apparatuses, for example, the ECU 108 of the monitoring system 100 of FIG. 1, appropriately programmed, may implement the process 300.

Figure 4:
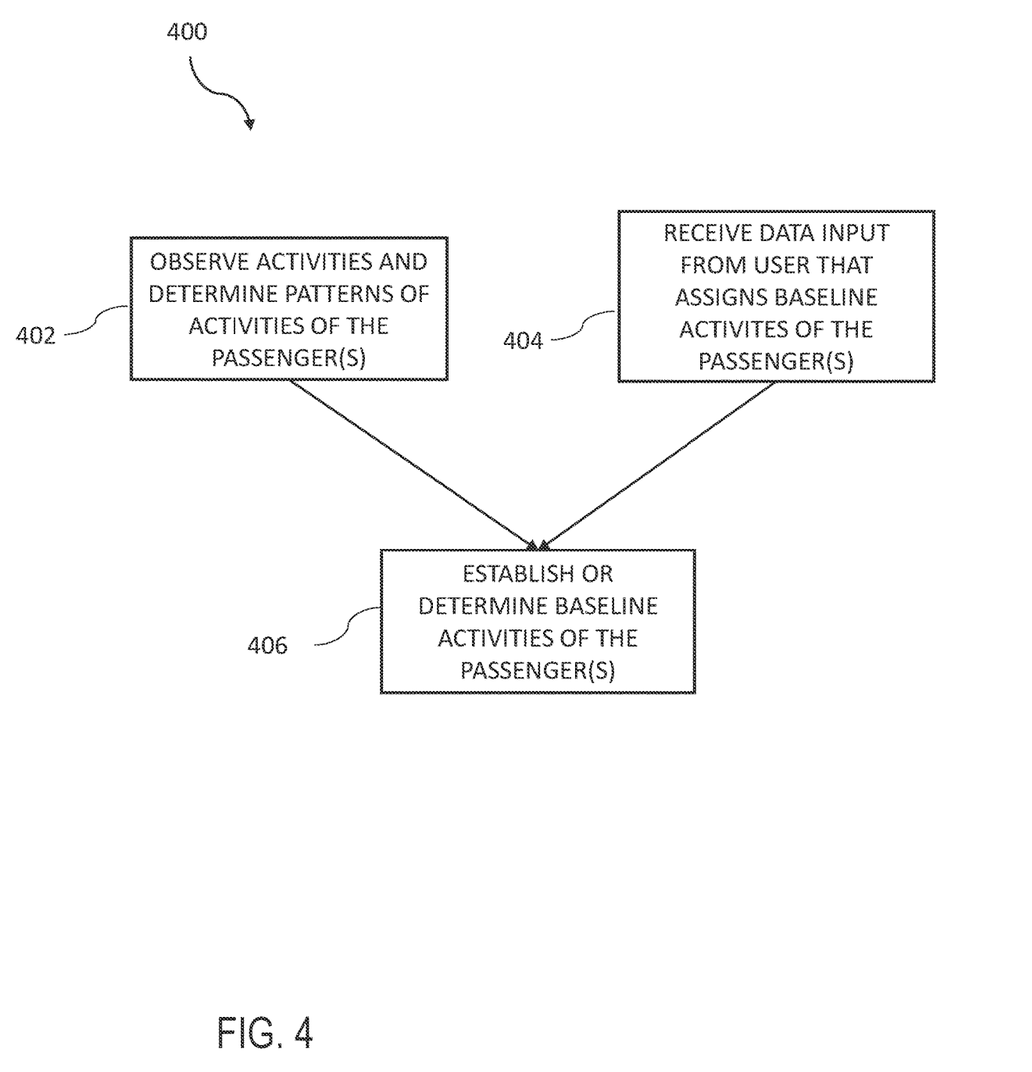
FIG. 4 is a flow diagram of an example process for generating, establishing or otherwise determining the baseline activities of passengers using the monitoring system of FIG. 1 according to an aspect of the invention.

Once the monitoring system 100 begins to capture image data to monitor for activity, the monitoring system 100 obtains or generates a baseline or a baseline model of passengers and their corresponding activities (302). The baseline or the baseline model is used to predict, determine or otherwise detect certain passenger activities. For example, the monitoring system 100 may predict when a baby passenger is sleeping or becoming agitated. In another example, the monitoring system 100 may predict when an animal passenger is excited by an event happening outside of the vehicle. In yet another example, the monitoring system 100 may predict when an upright item has become unsecured or unbalanced. FIG. 4 further describes obtaining or generating the baseline or the baseline model. The generation and use of the baseline or the baseline model provides a control model for the monitoring system 100 to compare the current situation with, which allows the monitoring system 100 to predictively determine when an activity is about to occur. By modeling the typical passenger activities, the monitoring system 100 adaptively uses machine learning to predict an activity of a passenger.

The monitoring system 100 recognizes passengers from the image data (304). In order to recognize the different passengers within the image data, the monitoring system 100 may segment, outline or otherwise map figures within the image data using multiple joints and segments. The segments may represent linear representations or outlines of a passenger and the joints may represent vertices, contours or other angles between the different segments.

Once the outline of the passenger is mapped, the monitoring system 100 may compare the representation of the multiple joints and segments to objects within a database of passengers, which have already been mapped, to identify the passenger. For example, the monitoring system 100 may compare an outline of a passenger, such as a child or pet, to a stored outline of a passenger and determine that the shape of the outlines match, and so the monitoring system 100 recognizes the passenger as the child or pet. Once the passenger is identified as a child or pet, the monitoring system 100 will segment the image into particular area of interests to monitor the passenger, which will reduce the amount of image processing required by the monitoring system 100. For example, a child may be monitored on its face, head, and arm areas. As another example, a pet may be monitored on its head, mouth, legs, and tail areas.

After the passengers are recognized and are matched to a corresponding passenger within the database of passengers, the monitoring system 100 determines the corresponding baseline activities of the passengers (306). The baseline and/or baseline model may have multiple activities that correspond to and are associated with the passenger within the database of passengers that matched the recognized passenger, such as if a baby is awake and content, or if an animal is sitting or lying down. These multiple motions may be considered the baseline activity of the passenger and may be used to compare with a different activity of the passenger to predict activity. The monitoring system 100 may utilize computer vision processing via the edge computing device 118 to efficiently process images and classify multiple desired recognitions, such that it would not cause unnecessary delay in alerting the user. This may be done by setting frequencies and sequences of prioritized recognition steps, simplifying the image comparing process, reducing the detection zone within an image by dynamic segmentation, etc. For example, the baseline and/or baseline model may include a set of frequencies for detecting particular activities, and particular activities may be identified in prioritized steps to confirm the prediction is accurate. For example, when a baby is waking up, the baseline model may first detect head movement, then mouth movement, then arm/hand/leg movement, then eye movement, then movement of other parts of the body in that particular order to determine that the baby is waking.

The monitoring system 100 then determines the activities of the passenger (308). The activity of a passenger may include, for example, a baby crying, an animal passenger standing up inside the vehicle, or an object passenger that has tipped over from an upright position. The monitoring system 100 tracks the segment or outline of the passenger across multiple frames of the image data taken over a period of time. The period of time in between the capture of different frames of the image data may be pre-configured or pre-set. The monitoring system 100 may predict or determine the activity using a machine learning algorithm that utilizes the baseline or the baseline model to make the prediction or determination using patterns. The monitoring system 100 may also process the self-learning to create/modify new baseline or baseline models to adapt for particular passengers. The new baseline or baseline models may be shared to other vehicles through the external database 104.

In response to determining that an activity of a passenger is occurring, the monitoring system 100 may buffer, record or capture the internal image data (310). The monitoring system 100 may already be buffering the internal image data in the memory 110 prior to detecting that an activity is occurring. The monitoring system 100 may continuously record and/or capture the internal image data in loop recording in the memory 110. The monitoring system 100 may stop the recording and/or capturing of the internal image data when the passenger activity returns to baseline. Alternatively, when the monitoring system 100 detects that the activity is occurring, the monitoring system 100 may set a timer to stop the buffering of the internal image data after a set amount of time. When the set amount of time expires, the monitoring system 100 may stop the recording and/or capturing of the internal image data and store the internal image data in the memory 110. The set amount of time may be pre-configured or configured via user input through the user interface 122.

Any image data that is captured outside the time frame of when the buffered image data begins and when the set amount of time ends may be deleted or otherwise removed from the memory 110 to save computing resources. Since the buffered internal image data begins recording before the activity is detected and until the set amount of time afterwards, the monitoring system 100 records and stores image data before, during, and after the activity.

In some implementations, the monitoring system 100 begins buffering and recording the image data after the determination that an activity is occurring. By activating the recording and/or buffering of the image data after detection of the activity, the monitoring system 100 reduces the amount of energy needed to operate the internal cameras 116a and/or the external cameras 116b, which increases the energy efficiency of the vehicle 102.

The monitoring system 100 may provide the image data to an output device (312). An output device is a computing device of a person using the monitoring system 100. The image data may be a notification icon indicating the activity of a passenger, such as a baby sleeping or a dog barking. Additionally or alternatively, the image data may be a live feed image of the data captured from the internal cameras 116a.

The monitoring system 100 may operate or control one or more vehicle components in response to the detecting a particular activity of a passenger (314). The monitoring system may activate the external cameras 116b when the monitoring system 100 detects that a passenger is agitated by an event occurring outside of the vehicle 102. The monitoring system 100 may slow the vehicle 102 to a stop on the side of the roadway when the monitoring system 100 detects that a particular passenger activity may be dangerous to the passenger or distracting to the driver, for example if an animal in truck bed becomes unsecured and/or is removed from the vehicle. In another example, the navigation unit 112 may inform the driver of nearby hospitals or reroute the vehicle to a nearby hospital, in the case of an autonomous or semi-autonomous vehicle, when the monitoring system detects that a passenger is ill or undergoing a physical emergency.

FIG. 4 is a flow diagram of an example process 400 for generating, establishing or otherwise determining the baseline activity of a passenger. One or more computers or one or more data processing apparatuses, for example, the ECU 108 of the monitoring system 100 of FIG. 1, appropriately programmed, may implement the process 400.

The monitoring system 100 observes the activities of the passengers within the vehicle, and when the activities of the passengers are repeated a number of times, the monitoring system 100 determines that there is a pattern of motions and facial expressions that are associated with certain activities of the passengers 402. For example, the monitoring system 100 may observe that a baby passenger often emotes a content expression with its eyes open. The monitoring system 100 may also observe that a baby passenger has its eyes closed for period of time when the baby is sleeping. The monitoring system 100 may also observe that a baby passenger is emoting an agitated expression with its mouth opened wide when the baby is crying. As another example, the monitoring system 100 may observe that a dog passenger often sits or lays down. The monitoring system 100 may also observe that a dog passenger is standing on all four legs, or that the dog is making rapid head movements when the dog is barking. Using this data, the monitoring system 100 establishes that passenger activities that occur with the most frequency are the baseline activities of the passengers 406. As a baseline activity of a passenger appears more frequently, the monitoring system 100 may increase a likelihood that the activity of the passenger is part of the baseline. Whereas, if the activity of the passenger appears less frequently, the monitoring system 100 may decrease a likelihood that the activity of the passenger is likely part of the baseline. The percentage or frequency necessary for inclusion in the baseline may be pre-determined and/or user-configured. Alternatively, the monitoring system 100 may receive data input from a user to indicate certain activities of passengers and manually assign those activities as baseline 404. For example, the monitoring system may observe passengers within the vehicle 102 and request that the user identify and assign an activity of a passenger as baseline, e.g., a fragile lamp that is sitting upright.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A monitoring system for a vehicle, comprising:
   a first camera configured to capture first image data including an image of one or more passengers in the vehicle;
   a memory configured to store baseline image data related to a sequence of a plurality of activities, motions, or facial expressions of at least one passenger of the one or more passengers in the vehicle, the plurality of activities, motions, or facial expressions of the at least one passenger being in a prioritized order; and
   an electronic control unit coupled to the first camera and the memory and configured to:
      obtain, from the first camera, the first image data,
      determine, based on the first image data, an observed sequence of a plurality of activities, motions, or facial expressions of the at least one passenger,
      identify, based on the baseline image data, a baseline sequence of a plurality of activities, motions, or facial expressions of the at least one passenger,
      predict, based on a comparison between the baseline sequence and the observed sequence of a plurality of activities, motions, or facial expressions of the at least one passenger, a future activity, motion, or facial expression of the at least one passenger, and
      record and capture, in the memory and using the first camera, second image data of the at least one passenger for a time period before, during, and after a time associated with the predicted future activity, motion, or facial expression.

2. The monitoring system of claim 1, wherein the first camera includes one or more internal cameras configured to capture, respectively, one or more different views of interior of the vehicle.

3. The monitoring system of claim 2, wherein the electronic control unit is connected to an output device, and wherein the electronic control unit is further configured to notify, via the output device, a user that the predicted future activity, motion, or facial expression is occurring during the time associated with the predicted future activity, motion, or facial expression.

4. The monitoring system of claim 3, wherein the output device includes one or more displays.

5. The monitoring system of claim 4, wherein the one or more displays include a vehicle display including one or more of a head up display, a multi-information display, and an in-vehicle infotainment display located in a front compartment of the vehicle.

6. The monitoring system of claim 4, wherein the one or more displays include a mobile display located on a mobile device.

7. The monitoring system of claim 6, wherein the vehicle is an autonomous vehicle, and the mobile display is located remotely from the vehicle.

8. The monitoring system of claim 4, further comprising a user interface configured to receive a first command from the user to display a first live video image from the one or more internal cameras on the one or more displays.

9. The monitoring system of claim 8, further comprising a second camera including one or more external cameras configured to capture, respectively, one or more views of a surrounding environment outside the vehicle.

10. The monitoring system of claim 9, wherein the user interface is further configured to receive a second command from the user to display a second live video image from the one or more external cameras on the output device.

11. The monitoring system of claim 3, wherein the electronic control unit is further configured to notify the user that the predicted future activity, motion, or facial expression is occurring by displaying an icon corresponding to the predicted future activity motion, or facial expression on the output device.

12. The monitoring system of claim 3, wherein the electronic control unit is further configured to notify the user that the predicted future activity, motion, or facial expression is occurring by displaying a live video image from the one or more internal cameras on the output device.

13. The monitoring system of claim 3, further comprising a navigation unit configured to obtain navigational map information including a location of an entity and a current location of the vehicle,
   wherein the electronic control unit is further configured to notify the user of a route to the location of the entity in response to the predicted future activity, motion, or facial expression occurring.

14. A monitoring system for a vehicle, comprising:
   a first camera configured to capture first image data including an image of a passenger in the vehicle;
   a memory configured to store baseline image data related to a sequence of a plurality of activities, motions, or facial expressions of the passenger in the vehicle, the plurality of activities, motions, or facial expressions of the passenger being in a prioritized order; and
   an electronic control unit coupled to the first camera and the memory and configured to:
      obtain the first image data from the first camera,
      determine a baseline sequence of a plurality of activities, motions, or facial expressions of the passenger based on the baseline image data,
      determine an observed sequence of a plurality of activities, motions, or facial expressions of the passenger based on the first image data,
      predict a future activity, motion, or facial expression of the passenger based on at least a part of the baseline sequence being different from a corresponding part of the observed sequence, and
      record and capture second image data of the passenger for a time period before, during, and after a time associated with the predicted future activity, motion, or facial expression in the memory by using the first camera.

15. The monitoring system of claim 14, wherein the determination of the baseline sequence includes:
   observation of an activity of the passenger,
   determination of a pattern of motions and facial expressions associated with the activity of the passenger, and
   determination of the activity of the passenger that occurs with a highest level of frequency.

16. The monitoring system of claim 14, further comprising a user interface configured to receive data input from a user, wherein the determination of the baseline sequence includes:
  receipt of the data input from the user that assigns a pattern of motions and facial expressions of the passenger as the baseline sequence.

17. A method for notifying a user of an output device of an activity, motion, or facial expression of a passenger within a vehicle, comprising:
  obtaining, by a processor, first image data of a compartment of the vehicle from a first camera, the first image data including an image of the passenger;
  determining, by the processor, an observed sequence of a plurality of activities, motions, or facial expressions of the passenger within the compartment of the vehicle based on the first image data;
  determining, by the processor, a baseline sequence of a plurality of activities, motions, or facial expressions of the passenger based on baseline image data stored in a memory connected to the processor, the plurality of activities, motions, or facial expressions of the passenger being in a prioritized order;
  predicting, by the processor, a future activity, motion, or facial expression of the passenger based on a comparison between the baseline sequence and the observed sequence;
  recording, by the processor, second image data associated with the predicted future activity, motion, or facial expression using the first camera;
  storing, by the processor, the second image data in the memory; and
  sending, by the processor, the second image data to the output device, thereby notifying the user of the predicted future activity, motion, or facial expression occurring.

18. The method of claim 17, wherein recording the second image data includes recording the second image data for a time period before, during, and after a time associated with the predicted future activity, motion, or facial expression.

19. The method of claim 17, further comprising:
  obtaining, by the processor, image data of a surrounding environment outside the vehicle from a second camera;
  recording, by the processor, the image data of the surrounding environment outside the vehicle using the second camera;
  storing, by the processor, the image data of the surrounding environment outside the vehicle in the memory; and
  sending, by the processor, the image data of the surrounding environment outside the vehicle to the output device after predicting the future activity, motion, or facial expression.

20. The method of claim 19, wherein recording the image data of the surrounding environment outside the vehicle includes recording the image data of the surrounding environment outside the vehicle for a time period before, during, and after a time associated with the predicted future activity, motion, or facial expression.

\* \* \* \* \*